Jan. 23, 1945.　　　　　R. J. WHITE　　　　　2,368,059
AIRCRAFT CONTROL SURFACE
Filed Dec. 8, 1941　　　　　2 Sheets-Sheet 1

INVENTOR
Roland J. White

INVENTOR
Roland J White

UNITED STATES PATENT OFFICE 2,368,059

AIRCRAFT CONTROL SURFACE

Roland J. White, Clayton, Mo.

Application December 8, 1941, Serial No. 422,121

2 Claims. (Cl. 244—90)

My invention pertains to a stabilizer and control surface arrangement for aircraft, particularly of the heavier than air type, and may be utilized either in the directional control assembly or in the longitudinal control assembly. This is a continuation in part of my application for United States Patent 2,265,213, dated December 9, 1941, and is directed more particularly to the alternate means of obtaining the superior stability and control characteristics described generally at the end of such patent.

The primary purpose of the horizontal tail group, from the stability point of view, is to produce forces that will restore the airplane to its equilibrium condition of steady flight should outside forces, such as a gust of wind, cause its equilibrium to be disturbed. The ability of a horizontal tail to perform this function may be measured by the restoring force produced for a given change in angle of attack. The amount of this restoring force is a measure of the static stability of the airplane. On the other hand, should the forces tending to restore a stable airplane be too great, unsatisfactory control characteristics will develop, particularly due to the fact that when the pilot desires voluntarily to change the direction of flight large control forces will be required to overcome the large stabilizing force.

Unfortunately the position of the airplane center of gravity (c. g.) will determine whether the restoring force for the complete airplane is large or small. If the c. g. is well forward a large stabilizing force will result, and as the c. g. is moved rearward the stabilizing force will become zero or even reverse making the airplane unstable.

My invention consists of a device which will permit the restoring force produced by the horizontal surfaces of an airplane to be varied in magnitude by the pilot in order to offset the undesirable restoring forces produced by the movement of the airplane c. g., thereby improving the range of the c. g. travel. It also comprises an attachment to the fixed part of the aircraft of a device which will cause a pivoted moveable control surface to move in the desired direction whenever the angular attitude of the aircraft is changed.

It is well known that a flap forming the rear portion of an airfoil will cause the lift of the airfoil to be effected upon the deflection of the flap; therefore, if the flap movement may be made to depend upon the angle of attack of the portion of the airfoil ahead of the flap, the rate of change of the lift of the airfoil with angle may be varied. This is referred to as the slope of the lift curve and governs the airplane static stability produced by the tail. When the aerodynamic hinge moment produced by deflecting the pivoted flap is reduced from that which is normal for the flap the pivoted surface is said to have aerodynamic balance. My invention may be made to produce both, a change in the slope of the lift curve, and at the same time contribute to the aerodynamic balance of the flap. When the pressure duct entrances, to be described, are located near the hinge axis of the flap then the aerodynamic balance will mainly be effected. On the other hand should the duct entrances be located near the leading edge of the airfoil or at some other part of the airplane away from the flap then the slope of the lift curve will mainly be effected.

In principle my invention consists of a moveable surface installed within the airplane which may be the stabilizer, fin, or even the wing or fuselage. Air ducts leading from the surface of the airplane to the region surrounding this internal moveable surface permit the air pressure static heads at the duct entrances to be transmitted to the internal surface. Several ducts may be provided, some of which permit pressures to be created on one side of this internal surface and the remainder used to transmit pressures to the opposite side of the surface. This internal surface, which is moveable, has the region adjacent to one of its sides sealed from the region adjacent to the opposite side so that the pressures created on one face of the moveable surface are independent to those created on the opposite side. The air ducts leading to these regions have their entrances located on the surface of the aircraft in such a manner that any angular disturbance of the aircraft will cause a difference in pressure to act on the opposite sides of the internal moveable surface. The resulting force on the internal surface due to this difference in air pressure will be transmitted by suitable means to produce a moment about the hinge axis of an exterior pivoted surface, or effect the motion of a tab attached to the moveable surface which in turn will produce an aerodynamic hinge moment about the pivot axis of the main external pivoted surface. This additional aerodynamic hinge moment will cause the exterior moveable surface to assume a position more desirable than that which is normally experienced by the present type of pivoted control surface. Means are provided in the mechanism used to transmit the moment, to regulate the amount and direction of the hinge moment acting on the pivoted external surface, which provides the pilot a means of regulating the aerodynamic characteristics of the airfoil. The external pivoted surface, may or may not, be connected with the main control system of the airplane. Should the pivoted surface be the elevator, rudder, or the aileron then the normal pilot controls may of course be attached. It may be desirable to use my invention on a separate stabilizing surface separate from the main controls of the airplane for which a definite advantage will result.

A further use of my invention would be to provide a small internal moveable surface within the airplane wing, connected by means described, to a small external pivoted surface at the trailing edge of the wing. This system would then produce a movement when the angle of attack of the wing is changed. A control arm incorporated in this system could be made to drive an electro-mechanical mechanism, such as a torque transmitting "Selsyn" or "Autosyn" or an electrical control which would operate an electric motor that would operate a second external pivoted surface which may be an elevator on a special horizontal surface, or a tab on such an elevator, or on the normal airplane elevator. This electrical means of control is not described but several types are available. The principle of any such electrical control must provide movement of the second external surface in a definite relation to the position of the internal moveable surface located within the airplane wing. Means of altering the amount of movement of the second external surface in relation to the movement of the internal surface could be made either in the electrical or the mechanical system of interconnection. A definite advantage of this type of control is that the pressure ducts venting the internal surface may be located far enough from the second external surface so that movement of this surface will not effect the air pressures existing at the air ducts. This would mean that pure stability characteristics could be obtained without effecting the aerodynamic balance of the special or normal elevator, which may be a desirable feature. If an electrical drive is used to move the second external surface this may be made to make the movement irreversible which would provide another advantage. Should the second external surface be located aft of the internal surface, then the effect of an aerodynamic disturbance at the wing would produce movement of the second external surface before the aerodynamic disturbance was felt at the external control surface, which is a further advantage.

The size of the internal and external surfaces, as well as the extent of the motion between said surfaces are not specified except in general, as these dimensions in particular will depend upon the extent of the control desired, and the stability of the system effecting motion of the two surfaces.

In describing my invention the following figures are presented as part of this patent specification:

Figure 1 is a detailed cross-section view of an airfoil control assembly taken chordwise along the airfoil and such as to show the side view of one individual internal surface, with a typical mechanism for transmitting the forces from the internal surface to a tab connecting to a pivoted external surface.

Figure 2 presents a cross-section taken along the line 2—2 of Figure 3.

Figure 1:
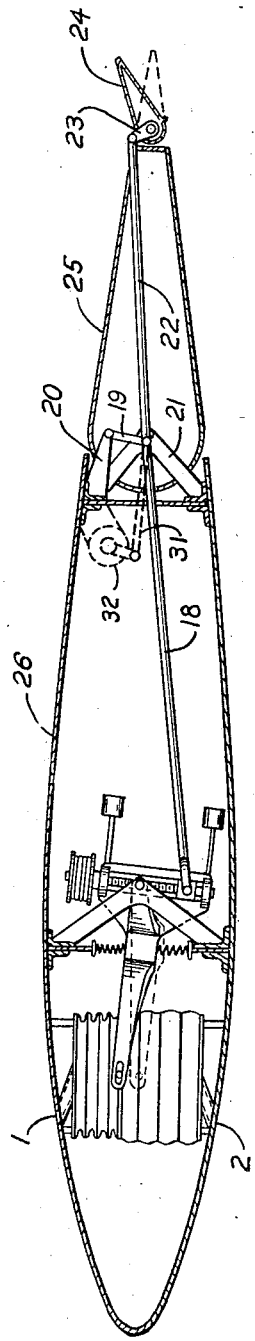
Figure 2:
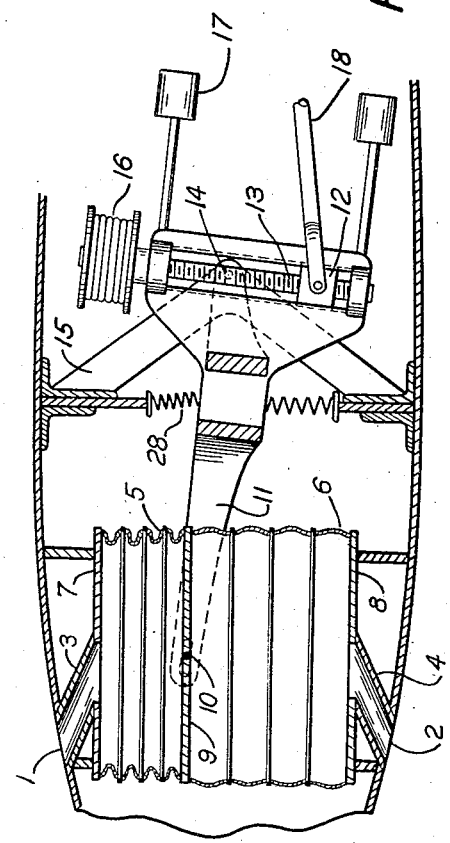
Figure 3:
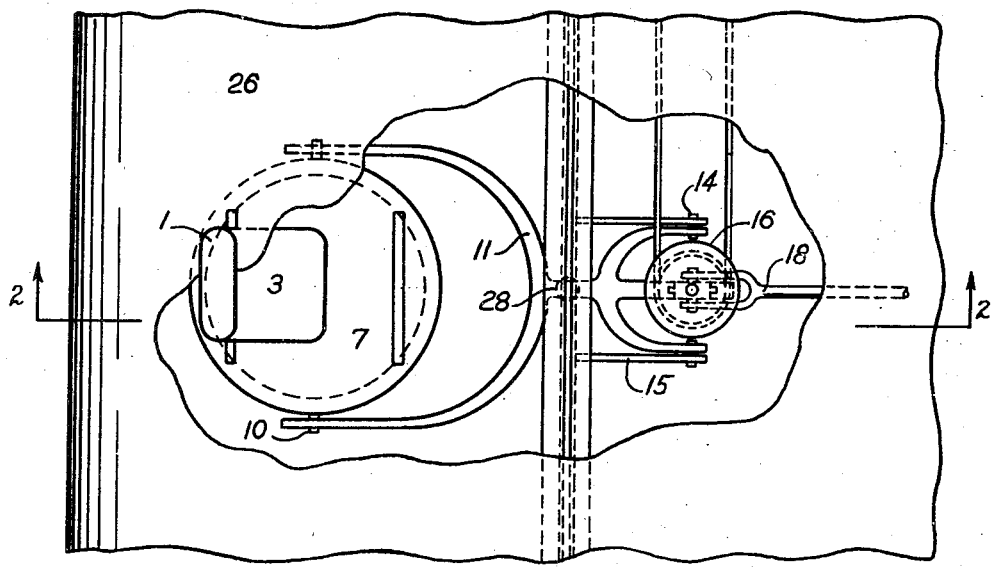
Figure 3 is a partial top view of Figure 1 looking through the airfoil with the airfoil covering cut away to better show the internal surface mechanism.

My invention operates in the following manner. A disturbance of the aircraft will cause the fixed or adjustable portion of the control assembly 26 to change its angular attitude with respect to the direction of motion of the aircraft, which will cause pressures at the air duct entrances 1 and 2 to change their magnitudes. Should, for example, the surface of assembly 26 have an increase in angle of attack, causing the nose of the airfoil to rise, the pressure at 1 will be reduced and the pressure at 2 increased. The decrease in pressure at entrance 1 will be transmitted by the air within the duct 3 and bellows 5 to the upper side of the internal surface 9. In a similar manner the increase in pressure at the duct entrance 2 will be transmitted by the lower duct 4 and bellows 6, which will cause an increase in pressure on the lower side of the internal surface 9. The action of these pressures will produce a force causing the surface 9 to move upward. This upward force will be transmitted by the pins 10 to the yoke 11 which will move upward with the surface 9. The yoke 11 is pivoted on the pins and bearings 14 which are held fixed with respect to the surface of assembly 26 by the supports 15. The angular motion of the yoke 11 will cause the push-rod 18 to move forward which will pull the pivoted surface push-rod 22 forward, thus causing the tab horn 23 to move the tab upward. The tab 24 will move upward to such a position that the moment on the tab will balance the air moment created by the surface 9. The upward motion of the tab 24 will produce an aerodynamic hinge moment on the pivoted surface 25 such as to cause the trailing edge of this surface to move downward. This downward movement of 25 will cause the lift of the airfoil to be increased thereby producing superior stabilizing action over that which would be obtained if the pivoted surface 25 were allowed to move freely in its normal manner.

Had the position of the sliding block 12 been adjusted such as to be located above the pin 14 then the tab 24 would have been forced downward for the angle of attack considered, and the pivoted surface 25 would move in the opposite direction causing the stabilizing action of the airfoil to be reduced.

Having described how my invention operates certain details of construction will be explained. The duct entrances 1 and 2 should be located near the leading edge of assembly 26 so that the pressure changes will be mostly due to the angle of attack change of the surface of 26. There will, however, be a pressure difference at 1 and 2 created by the deflection of the pivoted surface 25. This will produce some aerodynamic balance on the surface 25 which will tend to reduce the control forces, if the pilot controls are attached to 25, and when the block 12 is below the pivot 14. A certain amount of aerodynamic balance may be used to an advantage; but this should not be made too great or an instability of the control system will occur. I have found from calculations that the duct entrances should be located between 5% and 15% of the airfoil chord when my invention is used for stability purposes.

Should my invention be used to reduce control loads on the surface 25 then the ducts should be located near the pivot axis of 25.

The bellows 5 and 6 are to be made of a flexible material that is air tight and should be reinforced with rigid rings at intervals so that stresses produced by the air in the bellows will not affect the air forces acting on the surface 9 to any extent. The pins 10 are made to slide freely in the yoke 11, but for cases where the angular motion of the yoke is small the slots may not be necessary. As it is desirable to have the yoke 11 move uniformly and consistently with the pressures applied to the surface 9 the springs 28 have been added to the system. When the springs 28 are used, forces larger than normally required should be applied on the surface 9. Then the forces acting on the yoke 11 will act against those produced by the springs 28 giving the same net forces to be transmitted; but of a more uniform nature.

The block 12 is adjusted in relation to the pivot 14 by means of the lead screw 13 which may move the sliding block 12 to either side of the yoke pivot 14. Since the relative motions of surfaces 9 and 24 are determined by the position of block 12 in yoke member 11, as determined by screw 13, the yoke 11 becomes an automatic movable-datum link; movable automatically in response to movement of surface 9. This lead screw 13 is driven by the cable drum 16 which is wound with control cables leading to another drum that may be adjusted by the pilot while the airplane is in flight. By this means the pilot may change the mechanical advantages between the air moments operative on surfaces 9 and 24, thus causing them to assume various floating attitudes with respect to the airfoil 26 as a fixed datum, depending upon the adjustment of 12 in the movable-datum link 9. Instead of using the drum 16 an electric motor may easily be installed which may be controlled by the pilot. All parts of the system should be statically balanced by weights similar to those indicated by 17. When the control tab 24 is in its neutral position with respect to the pivoted surface 25 the pivot point common to the push rods 18 and 22 should coincide with the hinge axis of surface 25 and the link 19 should be long enough so that this pivot point does not depart to any extent from a line joining the tab hinge axis and the hinge axis of surface 25 when the tab 24 is deflected.

The arm 31 could be incorporated which would lead to an electro-mechanical control 32. The electro-mechanical control 32 could then be made to operate through suitable mechanism other arms such as 22 to effect movement of additional surfaces such as 24 and 25 but located elsewhere on the airplane.

Figure 4:
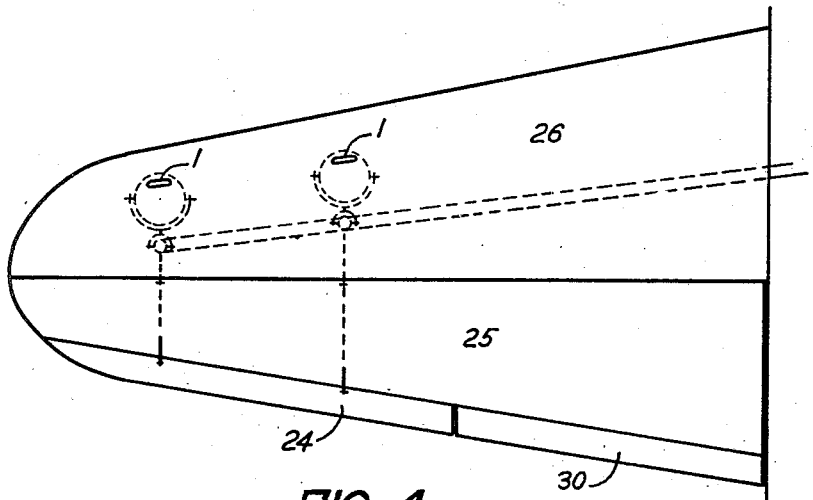
Figure 4 is a plan view of an airfoil surface having a pivoted control upon which is mounted a tab connected to the internal surfaces in addition to another tab to be used in the normal manner for trimming the airplane.

In Figure 4 a plan view of a typical installation of my invention is shown on and within an airfoil surface. Two internal surfaces are diagrammatically shown but more may be used. The tab 30 may be a trim tab or a balancing tab connected to operate with 25 but separate from my invention.

In view of the above, it will be seen that the several objects of the invention are achieved and other advantageous results attained.

As many changes could be made in the above constructions without departing from the scope of the invention, it is intended that all matter contained in the above description or shown in the accompanying drawings, shall be interpreted as illustrative and not in a limiting sense.

What I claim as my invention is:

1. An angle of attack control assembly for aircraft, comprising an airfoil, a first surface movably connected to the airfoil and responsive to different air pressures applied to different areas of the aircraft, said areas being selected such that air pressures will be created on the movable surface with certain moments effecting movements of the surface according to attack movements through the air of the airfoil, a second surface movable with respect to the airfoil and responsive to moments applied by air flow past said airfoil, a mechanical linkage operatively interconnecting said movable surfaces for effecting motion of the second surface relatively to the first surface in response to movement of the first surface until a balance of said moments is reached, an automatically movable-datum link in said linkage movable automatically with respect to the airfoil in response to movement of said first surface, a second link, a variable connection between said second link and said movable-datum link whereby the motion of the second surface relatively to that of the first surface may be changed, and pilot-controlled means for varying said connection, said linkage moving to various positions with respect to the airfoil as a fixed datum, as determined by the mechanical advantage effected by the linkage between moments on said surfaces acting through said movable-datum link, whereby said surfaces at predetermined angles of attack of the airfoil assume various predetermined floating attitudes with respect to the airfoil depending upon the variation in said connection.

2. An angle of attack control assembly for aircraft comprising an airfoil, a first movable surface connected to the airfoil and movably responsive to different air pressures applied to different areas of the aircraft, said areas being selected such that air pressures will be created on the movable surface with certain moments effecting movements of the surface according to various movements through the air of the airfoil, a second surface movable with respect to the airfoil and responsive to moments caused by air flow past said airfoil, a mechanical linkage operatively interconnecting said movable surfaces for effecting relative motion of the second surface relatively to the first surface in response to movement of the first surface either in the same or reverse sense until a balance of said moments is reached, an automatically movable-datum link in said linkage movable automatically with respect to the airfoil in response to movement of said first surface, a second link, a variable connection between said second link and said movable-datum link adapted for adjusting and reversing the sense of said motion of the second surface with respect to that of the first surface, and pilot-controlled means for varying said connection to effect adjustment and motion reversal, said linkage moving to various positions with respect to the airfoil as a fixed datum, as determined by the mechanical advantage effected by the linkage between the moments on said surfaces acting through said movable-datum link, whereby said surfaces at predetermined angles of attack of the airfoil assume various predetermined floating attitudes with respect to the airfoil depending upon the variation in said connection.

ROLAND J. WHITE.